US008904999B2

(12) United States Patent
Kondo et al.

(10) Patent No.: US 8,904,999 B2
(45) Date of Patent: Dec. 9, 2014

(54) RESIN GEARS AND THROTTLE DEVICES

(75) Inventors: Masanobu Kondo, Nagoya (JP); Hiroki Shimoto, Nagoya (JP); Hiroshi Tanimura, Kariya (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 854 days.

(21) Appl. No.: 12/875,324

(22) Filed: Sep. 3, 2010

(65) Prior Publication Data
US 2011/0056460 A1 Mar. 10, 2011

(30) Foreign Application Priority Data
Sep. 4, 2009 (JP) ................. 2009-204737

(51) Int. Cl.
*F02D 9/08* (2006.01)
*B29C 45/00* (2006.01)
*F16H 55/17* (2006.01)
*B29C 45/14* (2006.01)
*F02D 9/10* (2006.01)
*B29K 105/20* (2006.01)
*F02D 41/00* (2006.01)
*F02D 11/10* (2006.01)
*F16H 55/06* (2006.01)
*B29L 15/00* (2006.01)

(52) U.S. Cl.
CPC .......... *F02D 9/1065* (2013.01); *B29C 45/0046* (2013.01); *B29K 2105/203* (2013.01); *B29C 2045/0027* (2013.01); *F02D 41/0002* (2013.01); *F02D 2011/102* (2013.01); *F16H 55/17* (2013.01); *F02D 2200/0404* (2013.01); *B29C 45/14778* (2013.01); *F16H 2055/065* (2013.01); *B29L 2015/003* (2013.01); *B29C 45/0025* (2013.01); *F02D 9/108* (2013.01)
USPC ................... 123/337; 264/328.7; 264/328.12; 74/434

(58) Field of Classification Search
USPC ...................... 74/434, 439, DIG. 10; 123/337; 264/328.1–328.12; 425/543
See application file for complete search history.

(56) References Cited

U.S. PATENT DOCUMENTS 3,880,978 A * 4/1975 Apostoleris et al. ..... 264/328.12
4,549,800 A * 10/1985 Maeda ............................ 396/89
(Continued)

FOREIGN PATENT DOCUMENTS

JP 07-161110 6/1995
JP 09-234757 9/1997
(Continued)

OTHER PUBLICATIONS

German Search Report dated May 14, 2014, corresponding to German Patent Application DE 102010044261.5; with English translation attached.

*Primary Examiner* — Erick Solis
*Assistant Examiner* — Carl Staubach
(74) *Attorney, Agent, or Firm* — Ladas & Parry LLP

(57) ABSTRACT

A resin gear has a concave portion formed on a gear body at a position radially inward of a boundary region between a toothed portion and a non-toothed portion. During a molding process, a welded portion is formed at the non-toothed portion by merger of flow of the molten resin along a first path and flow of the molten resin along a second path. The first path detours the concave portion and passes through the side of the toothed portion, and the second path detours the concave portion and passes through the side of the non-toothed portion.

6 Claims, 8 Drawing Sheets

(56) References Cited

U.S. PATENT DOCUMENTS

| | | | |
|---|---|---|---|
| 4,781,879 A * | 11/1988 | Oishi | 264/328.12 |
| 5,493,551 A * | 2/1996 | Kido | 720/620 |
| 5,833,913 A * | 11/1998 | Ellwood et al. | 264/328.7 |
| 6,089,972 A * | 7/2000 | Gunji et al. | 454/233 |
| 7,302,931 B2 | 12/2007 | Saito et al. | |
| 7,406,891 B2 * | 8/2008 | Miyasaka | 74/431 |
| 7,927,029 B2 * | 4/2011 | Fujii et al. | 396/448 |
| 8,028,598 B2 * | 10/2011 | Hagihara | 74/431 |
| 8,100,026 B2 | 1/2012 | Suzuki et al. | |
| 2004/0241276 A1* | 12/2004 | Miyasaka | 425/543 |
| 2006/0231072 A1 | 10/2006 | Saito et al. | |
| 2007/0290680 A1 | 12/2007 | Hattori | |
| 2008/0087248 A1 | 4/2008 | Saito et al. | |

FOREIGN PATENT DOCUMENTS

| | | |
|---|---|---|
| JP | 2004-084503 | 3/2004 |
| JP | 2004084503 | 3/2004 |
| JP | 2004358665 | 12/2004 |
| JP | 2006291912 A | 10/2006 |
| JP | 2008-014479 | 1/2008 |

* cited by examiner

RESIN GEARS AND THROTTLE DEVICES

This application claims priority to Japanese patent application serial number 2009-204737, the contents of which are incorporated herein by reference.

BACKGROUND OF THE INVENTION

1. Field of the Invention

The present invention relates to resin gears and throttle devices incorporating the resin gears. The present invention also relates to methods of manufacturing the resin gears and apparatus for manufacturing the resin gears 2. Description of the Related Art Japanese Laid-Open Patent Publication No. 2004-84503 discloses a known electronically controlled throttle device having a resin gear fixed to a throttle shaft that has a throttle valve mounted thereto. The resin gear has a gear body having an outer peripheral portion formed with a toothed portion and a non-toothed portion. The resin gear is molded by injecting molten resin into a molding die having injecting gates provided on the side of the gear body. Japanese Laid-Open Patent Publication No. 2004-358665 discloses a resin gear having a toothed portion formed throughout the circumferential length of the outer periphery of the resin gear.

The resin gear disclosed in the Publication No. 2004-84503 has a concave portion disposed radially inwardly of the boundary region between the toothed portion and the non-toothed portion. A welded portion is formed at a merging point between the flow of molten resin detouring the concave portion and passing through the side of the tooted portion and the flow of molten resin detouring the concave portion and passing through the side of the non-toothed portion merge. The presence of the welded portion causes degradation in the strength of the teeth of the toothed portion and the molding accuracy of the toothed portion. Presumably, this degradation is caused because the distance of the flow of molten resin detouring the concave portion and passing through the side of the non-tooted portion from the corresponding injection gate to the welded portion is shorter than the distance of the flow of molten resin detouring the concave portion and passing through the side of the tooted portion from the corresponding injection gate to the welded portion. In the case of the resin gear disclosed in the Publication No. 2004-358665, this problem may not occur because a non-toothed portion is not provided.

Therefore, there is a need in the art for improving the strength and the molding accuracy of a resin gear that has a concave portion.

SUMMARY OF THE INVENTION

A resin gear has a concave portion formed on a gear body at a position radially inward of a boundary region between a toothed portion and a non-toothed portion. During a molding process, a welded portion is formed at the non-toothed portion by merger of flow of the molten resin along a first path and flow of the molten resin along a second path. The first path detours the concave portion and passes through the side of the toothed portion, and the second path detours the concave portion and passes through the side of the non-toothed portion.

DETAILED DESCRIPTION OF THE INVENTION

Figure 1:
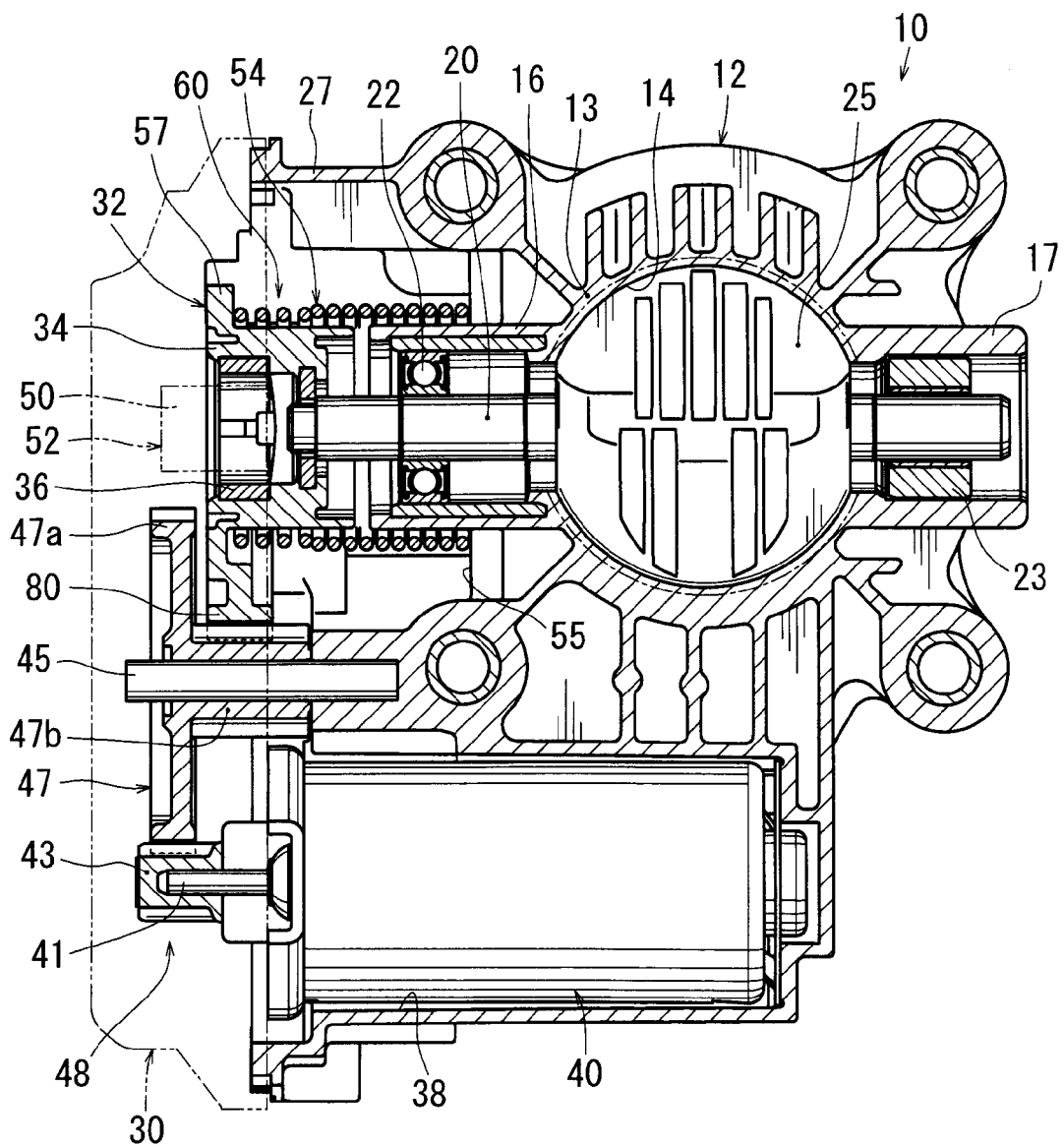
FIG. 1 is a vertical sectional view of a throttle device according to an example.

Each of the additional features and teachings disclosed above and below may be utilized separately or in conjunction with other features and teachings to provide improved resin gears, throttle devices having the resin gears, methods of manufacturing the resin gears, and apparatus for manufacturing the resin gears. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a resin gear includes a gear body, a toothed portion and a non-toothed portion formed on an outer periphery of the gear body, and a concave portion formed on the gear body at a position radially inward of a boundary region between the toothed portion and the non-toothed portion. The concave portion may have a bottom or may extend throughout the thickness of the gear body. The gear body, the toothed portion, the non-toothed portion and the concave portion are made of resin and molded together through injection of molten resin from an injection gate set on the side of the gear body. A welded portion is formed at the non-toothed portion by merger of flow of the molten resin along a first path and flow of the molten resin along a second path. The first path detours the concave portion and passes through the side of the toothed portion, and the second path detours the concave portion and passes through the side of the non-toothed portion.

Therefore, in comparison with the arrangement where the welded portion is formed at the toothed portion in the case that the concave portion is positioned radially inwardly of the boundary region between the toothed portion and the non-toothed portion, it is possible to improve the strength and the molding accuracy of the teeth of the toothed portion.

The injection gate may include a plurality of injection gates, from which the molten resin is injected to produce the welded portion. Therefore, it is possible to shorten the distances along paths of flow of molten resin from the injection gates to the welded portion.

A distance adjusting concave part may be provided at a position on the side of the non-toothed portion with respect to the concave portion. The distance adjusting concave part may have a bottom or extends throughout the thickness of the gear body. The distance adjusting concave part allows adjustment of a distance from the injection gate to the welded portion along the first path. Therefore, it is possible to prolong the distance of flow of molten resin detouring the concave portion and passing through the side of the non-toothed portion and flowing from the corresponding injection gate to the welded portion. As a result, it is possible to easily set the welded portion at the non-toothed portion.

The resin gear may include a resistance adjusting concave part allowing reduction of a resistance against flow of the molten resin along the first path than a resistance against flow of the molten resin along the second path. The resistance adjusting concave part may have a bottom or extends throughout the thickness of the gear body. Therefore, the flow of the molten resin detouring the concave portion and passing through the side of the toothed portion becomes faster than the flow of the molten resin detouring the concave portion and passing through the side of the non-toothed portion. With this arrangement, it is also possible to easily set the welded portion at the non-toothed portion, which is formed by the merger of the flow of the molten resin detouring the concave portion and passing through the side of the toothed portion and the flow of the molten resin detouring the concave portion and passing through the side of the non-toothed portion.

The resistance adjusting concave part may include an annular groove formed in an end surface of the gear body. The annular groove may have a first part positioned on the side of detouring the concave portion and passing through the side of the toothed portion and a second part positioned on the side of detouring the concave portion and passing through the side of the non-toothed portion. The first part has a depth shallower than a depth of the second part. Therefore, the annular groove formed on the end surface of the gear body is used as the resistance adjusting concave portion to make the flow of the molten resin detouring the concave portion and passing through the side of the toothed portion faster than the flow of the molten resin detouring the concave portion and passing through the side of the non-toothed portion, so that it is possible to set the welded portion at the non-toothed portion.

In another example, a throttle device includes the resin gear as a throttle gear that is fixedly mounted to a throttle shaft having a throttle valve.

A torsion coil spring for biasing the throttle gear has a hook portion engageable with the concave portion of the throttle gear. Thus, the concave portion is used for engaging the hook portion of the torsion coil spring.

The throttle device may further include a throttle open angle sensor for detecting an open angle of the throttle valve. The throttle open angle sensor includes two permanent magnets. The injection gate includes at least two injection gates. The throttle gear is molded with the permanent magnets inserted into a molding die for molding the throttle gear, while each of the permanent magnets being position at an intermediate position between two of the at least two injection gates. Therefore, it is possible to equalize the pressures of the molten resin injected from the injection gates and applied to the permanent magnets. As a result, it is possible to prevent movement of the permanent magnets caused due to pressure difference of the molten resin.

In another example, a method of manufacturing a resin gear is provided. The method includes molding the resin gear through injection of molten resin into a mold cavity of a molding die via an injection gate positioned on the side of the gear body to be molded, so that a welded portion is formed at the non-toothed portion by merger of flow of the molten resin along a first path and flow of the molten resin along a second path.

In a further example, an apparatus for manufacturing a resin gear is provided. The apparatus includes the molding die defining the mold cavity and the injection gate. The mold cavity having a configuration conforming to the configuration of the resin gear. The injection gate communicates with the mold cavity and is positioned on the side of the gear body to be molded. The resin gear is molded through injection of molten resin into the mold cavity via the injection gate, so that a welded portion is formed at the non-toothed portion by merger of flow of the molten resin along a first path and flow of the molten resin along a second path.

Figure 2:
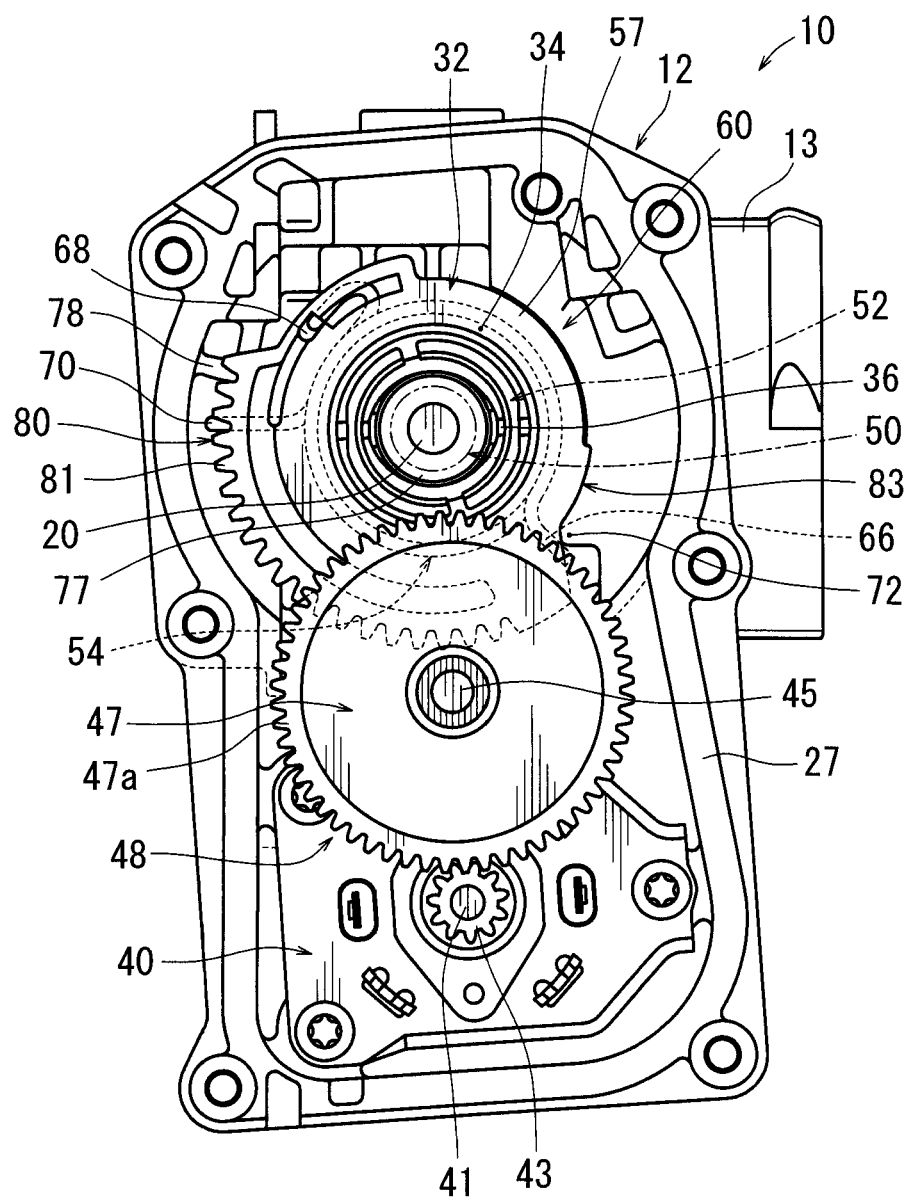
FIG. 2 is side view, with a cover removed, of the throttle device.

A representative example will now be described with reference to FIGS. 1 to 12. Referring to FIGS. 1 and 2, there is shown an electronic throttle device for controlling flow of intake air supplied to an internal combustion engine of a vehicle, such as an automobile. For the purpose of explanation, the throttle device will be first described and a throttle gear of the throttle device will be thereafter described. In FIGS. 1 and 2, the throttle device is shown in a vertical sectional view and a side view, respectively.

Referring to FIG. 1, a throttle device 10 has a throttle body 12. The throttle body 12 includes a bore wall portion 13 defining a cylindrical intake air passage 14 therein. The bore wall portion 13 is disposed at a midway point of an intake air system of the engine, i.e., between an air cleaner and an intake manifold (not shown). On the right and left sides of the bore wall portion 13, a pair of right and left bearing boss portions 16 and 17 are formed and have a same axis. A throttle shaft 20 extends across the intake air passage 14 in a diametrical direction (left or right direction as viewed in FIG. 1) and has opposite ends rotatably supported by the bearing boss portions 16 and 17 via bearings 22 and 23, respectively. A butterfly-type throttle valve 25 having a disc-shaped configuration is formed integrally with the throttle shaft 20 for opening and closing the intake air passage 14. The throttle valve 25 is rotatably driven together with the throttle shaft 20 by a control motor 40 serving as a drive source, so that the flow rate of the intake air flowing through the intake air passage 14 can be controlled.

On one side (left side as viewed in FIG. 1) of the throttle body 12, a gear housing 27 is formed to surround the circumference of this side of the throttle body 12 (see FIG. 2). A gear cover 30 is mounted to close an open side of the gear housing 27 (see FIG. 1), so that a gear accommodating space is defined within the gear housing 27. One of the end portions (left end portion as viewed in FIG. 1) of the throttle shaft 20 supported by the bearing boss portion 16 within the gear housing 27 extends into the gear housing 27. A throttle gear 32 made of resin and configured as a sector gear is mounted to the one end portion of the throttle shaft 20. A cylindrical tubular gear body 34 is formed centrally of the throttle gear 32. A pair of permanent magnets 36 are mounted to the inner circumferential surface of the gear body 34 so as to be opposed to each other.

As shown in FIG. 1, the throttle body 12 has a motor housing portion 38. The motor housing portion 38 has a bottomed tubular configuration and is open into the gear housing 27. The control motor 40 is disposed within the motor housing portion 38 and has an output rotational shaft 41 extending into the gear housing portion 27. The control motor 40 may be an electric motor, such as a DC motor. A pinion gear 43 is fixedly attached to the output rotational shaft 41. The operation of the control motor 40 may be controlled by an electronic control device, such as an engine control unit (ECU) provided on the automobile, according to an acceleration signal representing a stepping amount of an accelerator pedal, a traction control signal, a constant speed running signal, an idling speed control signal, etc. The control motor 40 may be called "electrically driven actuator."

A countershaft 45 is supported on the throttle body 12 and extends into the gear housing portion 27. The countershaft 45 is positioned parallel to and between the throttle shaft 20 and the output rotational shaft 41 of the control motor 40. A counter gear 47 is rotatably supported on the countershaft 45. The counter gear 47 has a large diameter gear portion 47a and a small diameter gear portion 47b that have the same axis. The large diameter gear 47a engages the pinion gear 43. The small diameter gear 47b engages the throttle gear 32 (more specifically, a toothed gear portion 80 that will be explained later). Therefore, when the control motor 40 is driven to rotate the output rotational shaft 41 in a normal direction or a reverse direction, the rotation of the output rotational shaft 41 is transmitted to the throttle gear 32 via the pinion gear 43 and the counter gear 47, so that the throttle shaft 20 rotates to open and close the throttle valve 25. The pinion gear 43, the counter gear 47 and the throttle gear 32 constitute a reduction gear mechanism 48.

A magnetic detection element 50 is disposed on the inner side of the gear cover 30. The magnetic detection element 50 may be a Hall element, a Hall IC, a magnetoresitive element or any other suitable element and is coaxially loosely fitted into the gear body 34 of the throttle gear 32. The magnetic detection element 50 can produce an electric signal, such as a voltage signal, corresponding to the intensity of a magnetic field that may vary with rotation of the throttle gear 32. The electric signal of the magnetic detection element 50 is outputted to the electronic control device. The permanent magnets 36 of the throttle gear 32 and the magnetic detection element 50 of the gear cover 30 constitute a throttle open angle sensor 52 that can detect the open angle of the throttle valve 25 in a non-contact manner.

A torsion coil spring 54 made of metal is interposed between a surface of the throttle body 12 and a surface of the throttle gear 32, which are opposed to each other. More specifically, the torsion coil spring 54 (hereinafter simply referred to as "coil spring 54") is fitted on the gear body 34 of the throttle gear 32 and the bearing boss portion 16 of the throttle body 12 so as to extend therebetween. An end surface (right end surface as viewed in FIG. 1) of the coil spring 54 is in contact with a seat surface 55 formed around the bearing boss portion 16. The other end surface (left end surface as viewed in FIG. 1) is in contact with a flange portion 57 of the throttle gear 32. The coil spring 54 serves to resiliently hold the throttle valve 25 at an opener open angle. Here, the term "opener open angle" is used to mean a predetermined open angle of the throttle valve 25, which can provide an amount of intake air allowing retreat running of the automobile. The throttle gear 32 and the coil spring 54 are pre-assembled with each other as a sub-assembly (hereinafter called "throttle gear sub-assembly) before being assembled with the throttle body 12. The throttle gear sub-assembly is shown in a side view in FIG. 3 and in a bottom view in FIG. 4, in which the sub-assembly is labeled with the reference numeral "60." For the purpose of explanation, the side of the flange 57 of the throttle gear 32 and the side of the gear body 34 and the coil spring 54 will be hereinafter referred to as an upper side and a lower side, respectively.

Figure 3:
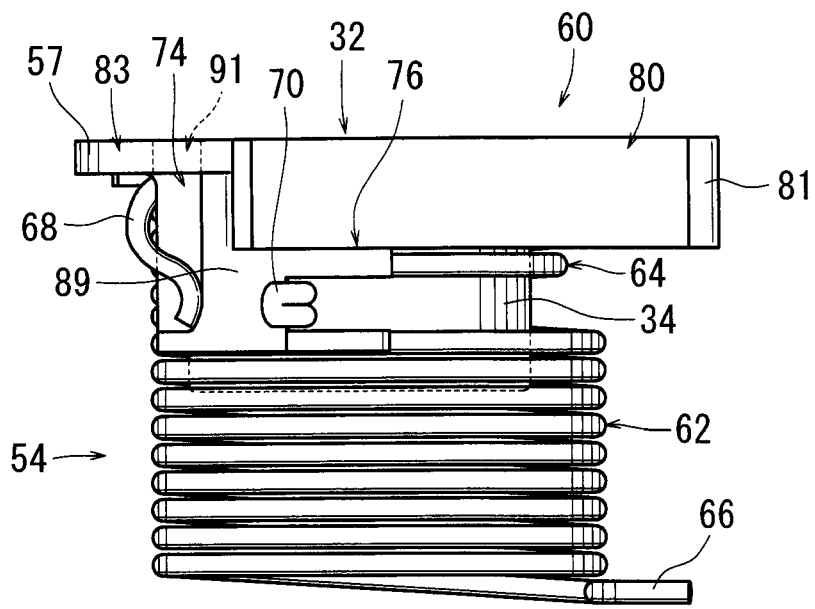
FIG. 3 is a side view of a throttle gear sub-assembly of the throttle device.
Figure 4:
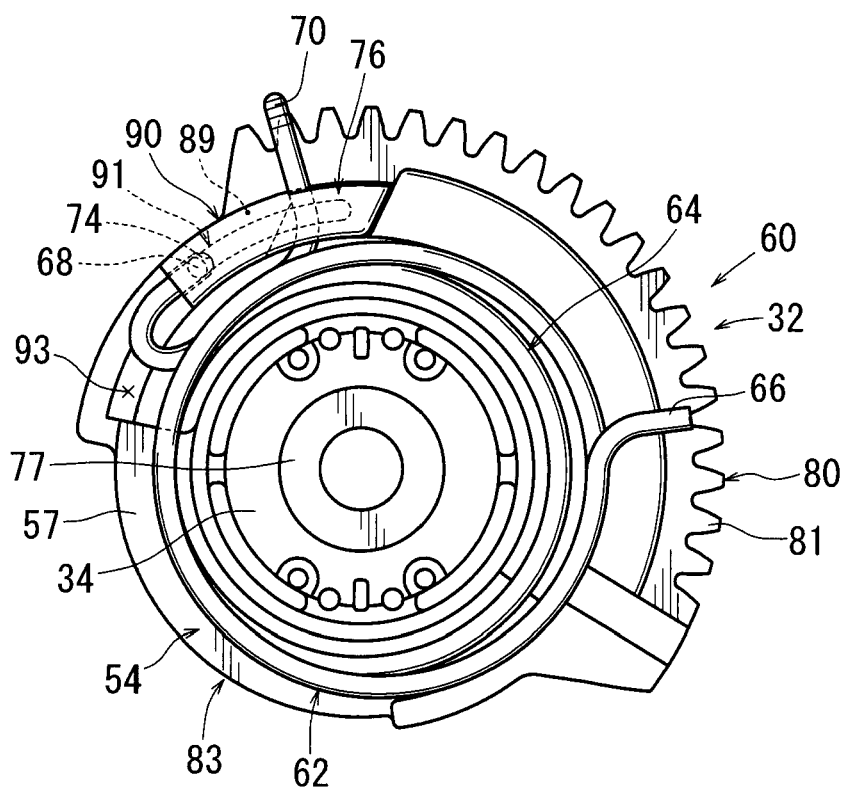
FIG. 4 is a bottom view of the throttle gear sub-assembly.

As shown in FIGS. 3 and 4, the coil spring 54 is formed of a single spring wire and includes a return spring part 62 and an opener spring part 64. The winding direction of the return spring part 62 is different from that of the opener spring part 64 and the number of turns of the return spring part 62 is larger than that of the opener spring part 64. The opener spring part 64 and the return spring part 62 (more specifically, its end portion on the side of the opener spring part 64) are fitted onto the gear body 34 of the throttle gear 32. At the free end portion of the return spring part 62, an I-shaped hook 66 is formed and extends radially outward. The I-shaped hook 66 is engaged with the side the throttle body 12 as will be explained later. At the free end portion of the opener spring part 64, an S-shaped hook 68 is formed to extend radially outward. At a position on the outer circumferential side of the opener spring part 64, the S-shaped hook 68 is bent in a direction of intersecting with the coiled portion. The S-shaped hook 68 is engaged with a hook engaging portion 74 formed on the throttle gear 32 as will be explained later. At the connecting portion between the return spring part 62 and the opener spring part 64, a U-shaped hook 70 is formed and extends radially outward. A hook engaging portion 76 configured as a groove is formed in the side surface of the throttle gear 32. The U-shaped hook 70 is engaged with the hook engaging portion 76 in such a manner that the U-shaped hook 70 can move toward the open side (right side as viewed in FIG. 3) relative to the hook engaging portion 76. The throttle gear 32 will be explained later in more detail.

The sub-assembly 60 of the throttle gear 32 and the coil spring 54 (see FIGS. 3 and 4) is assembled with the throttle body 12 (see FIGS. 1 and 2). More specifically, the sub-assembly 60 is assembled with the throttle body 12 after the throttle shaft 20 and the bearings 22 and 23 have been assembled with the throttle body 12. At the time of assembling the sub-assembly 60, in the state that a torsional force is applied to the return spring part 62 of the return spring 54 in a direction of decreasing the diameter of the return spring part 62, the I-shaped hook 66 is engaged with the hook engaging portion 72 on the side of the throttle body 12 (see FIG. 2). In addition, a mount plate 77 mounted to the gear body 34 is fitted on the end portion of the throttle shaft 20 and is integrally fixed thereto by a suitable fixing means, such as screws, a crimping device and adhesive. Then, the control motor 40, the countershaft 45 and the counter gear 47, etc., are assembled with the throttle body 12, and thereafter, the gear cover 30 is mounted to the throttle body 12 (see FIG. 1).

The followings are the operations of the throttle device 10. When the engine is started, the control motor 40 is driven under the control of the ECU, so that the rotation of the output rotational shaft 41 of the control motor 40 is transmitted to the throttle gear 32 via the pinion gear 43 and the counter gear 47, and hence, the throttle shaft 20 and the throttle valve 25 rotate. Therefore, the flow rate of the intake air flowing through the intake air passage 14 of the throttle body 12 can be adjusted. Within a large open angle range where the open angle is larger than the opener open angle, the throttle gear 32 rotates against the biasing force of the return spring part 62 in the state that the U-shaped hook 70 is engaged with the hook engaging portion 76 by the biasing force of the opener spring part 64. On the other hand, within a small open angle range where the open angle is smaller than the opener open angle, the U-shaped hook 70 of the coil spring 54 contacts an opener position stopper 78 disposed within the gear housing portion 27 of the throttle body 12, so that the U-shaped hook 70 is prevented from moving in the closing direction. Therefore, the throttle gear 32 rotates against the biasing force of the opener spring part 64, and then, the U-shaped hook 70 moves in the opening direction (rightward as viewed in FIG. 3) relative to the hook engaging portion 76. When the engine is stopped or no power is supplied to the control motor 40, for example, due to some troubles, the U-shaped hook 70 is brought to engage the hook engaging portion 76 of the throttle gear 32 by the biasing force of the opener spring part 64 of the coil spring 54. At the same time, the U-shaped hook 70 is brought to contact the opener position stopper 78 by the biasing force of the return spring part 62. Therefore, throttle gear 32 is held in the opener open angle.

The throttle gear 32 will now be described in detail. The throttle gear 32 is shown in various views in FIGS. 5 to 9 and 12. For the purpose of explanation of the throttle gear 32, the side of the flange portion 57 and the side of the gear body 34 will be hereinafter referred to as an upper side and a lower side, respectively.

Figure 5:
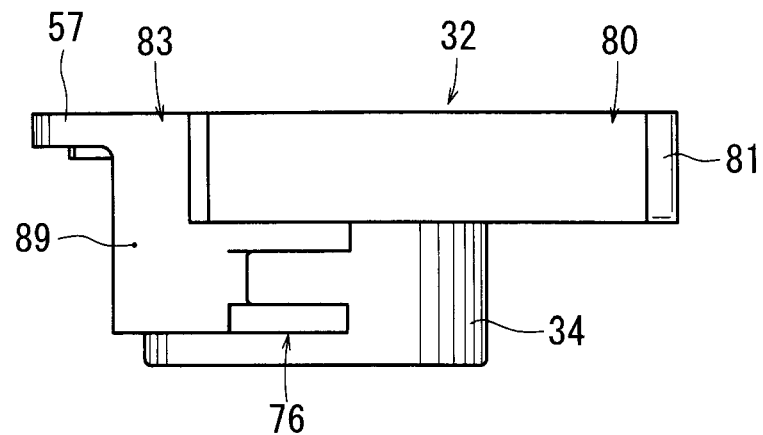
FIG. 5 is a side view of a throttle gear of the throttle gear sub-assembly.
Figure 6:
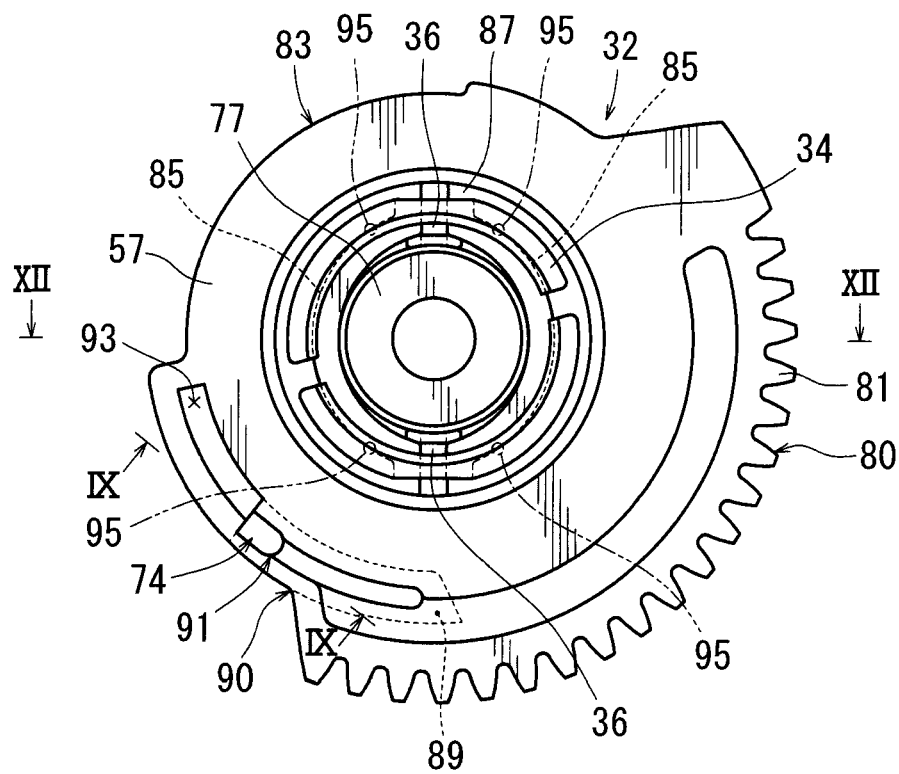
FIG. 6 is a plan view of the throttle gear.
Figure 7:
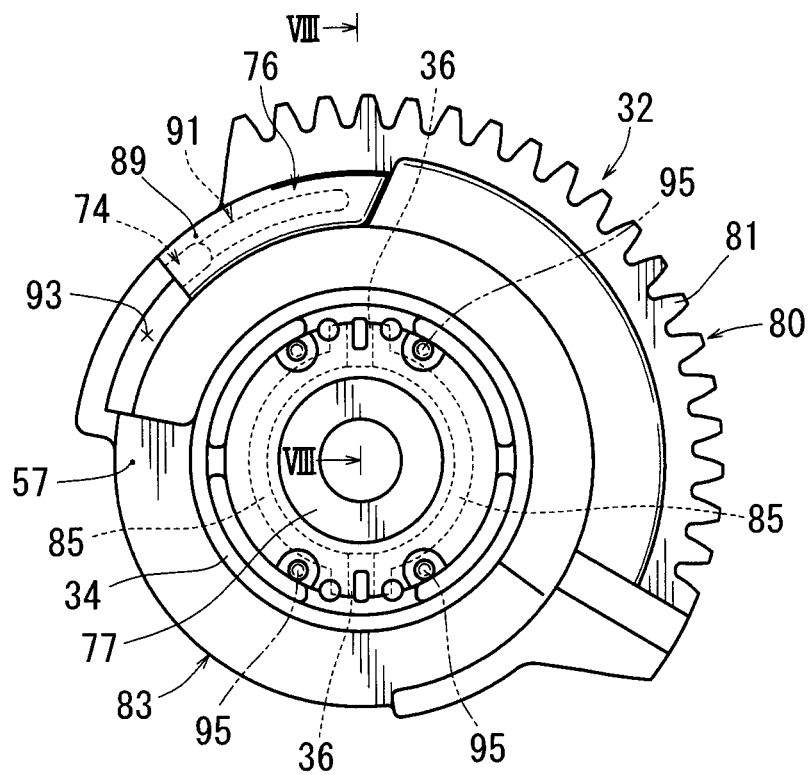
FIG. 7 is a bottom view of the throttle gear.
Figure 8:
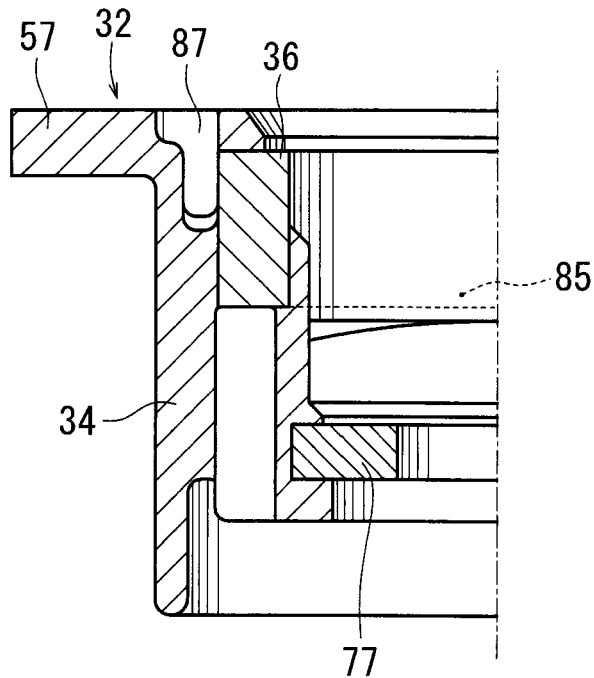
FIG. 8 is a cross sectional view taken along line VIII-VIII in FIG. 7.
Figure 9:
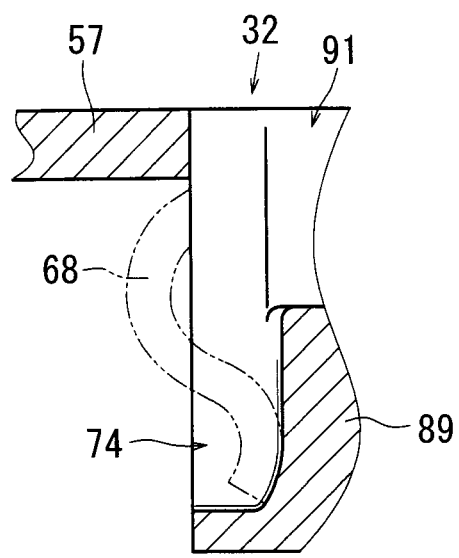
FIG. 9 is a cross sectional view taken along line IX-IX in FIG. 6.

Referring to FIGS. 5 to 7, the throttle gear 32 is made of resin. In other words, the throttle gear 32 is a resin gear. The throttle gear 32 is molded by an injection molding process of molten resin. The throttle gear 32 has the gear body 34 and the flange portion 57. The gear body 34 has a cylindrical tubular configuration. The flange portion 57 has an annular shape and formed on the outer peripheral surface of the upper end of the gear body 34. The tooted portion 80 is formed on the outer peripheral portion of the flange portion 57 and has a predetermined number of gear teeth 81. The rest of the outer peripheral portion of the flange portion 57, i.e., a portion other than the toothed portion 80, is formed as a non-toothed portion 83, so that the throttle gear 32 is configured like a sector gear. Within the upper portion of the gear body 34, the pair of permanent magnets 36 and a pair of yokes 85 magnetized by the permanent magnets 36 are arranged alternately in the circumferential direction. The mount plate 77 has an annular shape and is fitted within the lower portion of the gear body 34 so as to be coaxial therewith. The permanent magnets 36, the yokes 85 and the mount plate 77 are integrated with the gear body 34 by an insertion molding process. An annular groove 87 is formed in the upper end surface of the gear body 34 so as to be coaxial with the gear body 34 (see FIGS. 6 and 12). The inner circumference of the groove 87 is configured to be partly opposed to the outer circumferential surfaces of the permanent magnets 36 and the yokes 85.

On the outer peripheral portion of the throttle gear 32 on the lower side of the flange portion 57, an arc-shaped hook wall portion 89 is formed so as to be coaxial with the gear body 34 (see FIG. 7). The hook wall portion 89 is positioned radially inwardly of a boundary region 90 between the toothed portion 80 and the non-toothed portion 83 of the flange portion 57. More specifically, a half part in the circumferential direction of the hook wall portion 89 is positioned radially inwardly of the toothed portion 80 and the remaining half part of the hook wall portion 89 is positioned radially inwardly of the non-toothed portion 83. The hook engaging portion 74 for engaging the S-shaped hook 68 is formed on the half part of the hook wall portion 89 on the side of the non-toothed portion 83. The hook engaging portion 76 for engaging the U-shaped hook 70 is formed on the half part of the hook wall portion 89 on the side of the toothed portion 80 (see FIG. 5).

The hook engaging portions 74 and 76 define U-shaped recesses, respectively, which have open sides oriented in opposite directions. The hook engaging portion 76 is positioned at the lower half of the hook wall portion 89. In order to provide the hook engaging portions 74 and 76, an arc-shaped concave portion 91 is formed at the upper surface of the flange portion 57 and extends in the circumferential direction about the same axis as the flange portion 57 (see FIG. 6). In this example, the concave portion 91 is an arc-shaped recess but may be an arc-shaped slot. More specifically, the concave portion 91 is formed at the flange portion at a position radially inwardly of the boundary region 90 between the toothed portion 80 and the non-toothed portion 83 of the flange portion 57. The upper side of the hook engaging portion 74 for the S-shaped hook 68 is open at one end of the concave portion 91 on the side of the non-toothed portion 83. In other words, the hook engaging portion 74 is formed at the one end of the concave portion 91 on the side of the non-toothed portion 83. Further, an arc-shaped slot (or an arc-shaped through-hole) 93 is formed in the flange portion 57 throughout the thickness thereof and extends in series with the end portion of the concave portion 91 on the side of the non-toothed portion 83 (see FIGS. 6 and 7). The slot 93 serves as a distance adjustment concave portion as will be explained later.

As shown FIG. 7, two pairs of injection gates 95, through which molten resin is injected for molding the throttle gear 32, are set to be spaced equally from each other in the circumferential direction on the lower side of the gear body 34. Thus, four injection gates 95 are set in this example. An intermediate position between two injection gates 95 of each pair is set to be a position where one of the permanent magnets 36 is inserted during the insert molding process. In addition, the two pairs of injection gates 95 are positioned on a circle line so as to be symmetrical with respect to a central pint of the circle line. The injection gates 95 are provided at a molding die 100 (explained later) used for molding the throttle gear 32 and are shown by two-dotted chain lines in FIG. 7 for the purpose of illustration.

Figure 10:
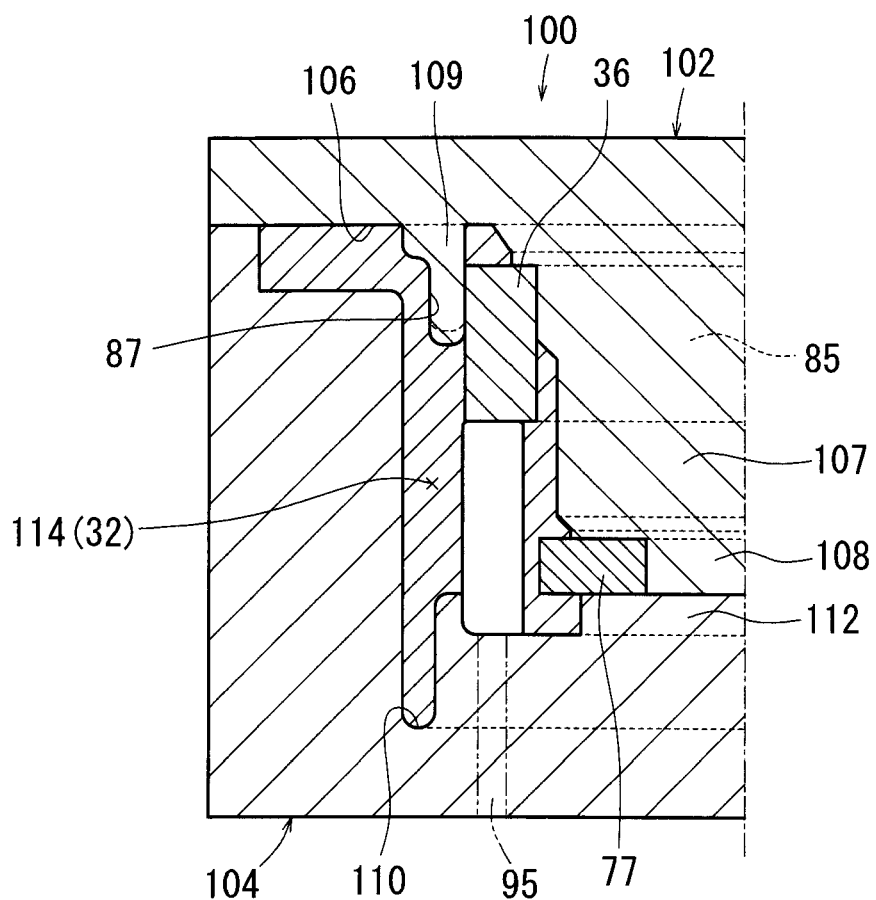
FIG. 10 is a vertical sectional view of a molding die used for molting the throttle gear.

The molding die 100 will now be described with reference to FIG. 10 that shows the molding die 100 in a vertical sectional view. Referring to FIG. 10, the molding die 100 includes an upper die part 102 as a stationary die part and a lower die part 104 as a movable die that can move relative to the upper die part 102 for opening and closing the molding die 100. The upper die part 102 has a lower side formed with a molding surface 106 having a configuration conforming to the configuration of an upper side part of the throttle gear 32 (see FIGS. 5 to 7). A core 107 is disposed at the molding surface 106 and has a configuration conforming to the configuration of the inner circumferential surface of the throttle gear 32. The lower end surface of the core 107 faces to the upper surface of the mount plate 77 and is formed with a projection 108 for fitting into a corresponding hollow space formed in the mount plate 77. In addition, a protrusion 109 having a configuration conforming to the configuration of the annular groove 87 (see FIG. 6) is formed on the molding surface 106. The protrusion 109 can contact portions of the outer circumferential surfaces of the permanent magnets 36 and also contacts portions of the outer circumferential surfaces of the yokes 85 (see FIG. 6), so that the permanent magnets 36 and the yokes 85 are positioned, and more specifically, the permanent magnets 36 and the yokes 85 are prevented from moving radially outward. The lower die part 104 has an upper side formed with a molding surface 110 having a configuration conforming to the configuration of the lower side part of the throttle gear 32. A core 112 is disposed at the molding surface 110 and has a configuration conforming to the configuration of the inner circumferential surface of the lower end portion of the throttle gear 32 (more specifically, the gear body 34). The upper end surface of the core 112 faces to the lower surface of the mount plate 77 and to the lower surface of the protrusion 108 of the core 107 of the upper die part 102. The injection gates 95 are formed in the lower die part 102. Although not shown in FIG. 10, a slidable die part for molding the hook engaging portion 76 is provided at the upper die part 102.

A cavity 114 is defined between the upper die part 112, the lower die part 104 and the slide die part when these die parts are closed. When closing the die parts, the permanent magnets 36, the yokes 85 and the mount plate 77 may be positioned within the cavity 114. Molten resin is then injected into the cavity 114 through the injection gates 95 at a predetermined injection pressure by an injection molding machine (not shown). Therefore, the throttle gear 32 is molded by resin, while the permanent magnets 36, the yokes 85 and the mount plate 77 being inserted into the mold resin of the throttle gear 32. After completion of the injection process, the molten resin is solidified, the lower die part 104 and the slide die part are opened, and the molded throttle gear 32 is then taken out from the molding die 100.

Figure 11:
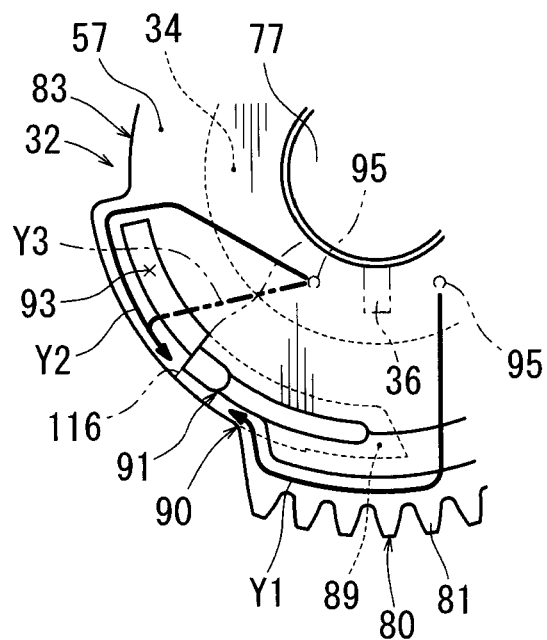
FIG. 11 is an explanatory view showing the flow of molten resin around a concave portion of the throttle gear.
Figure 12:
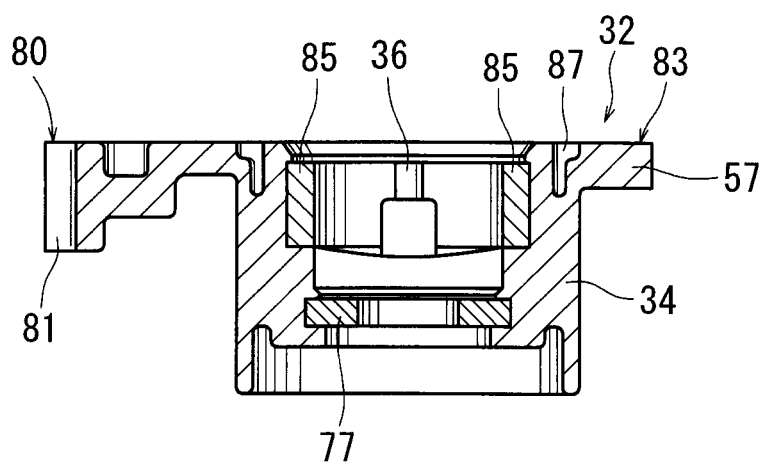
FIG. 12 is a sectional view taken along line XII-XII in FIG. 6.

The flow of molten resin during the molding process will now be described. For the purpose of explanation, the flow of the molten resin will be described with reference to portions of the throttle gear 32 to be molded by the molten resin. As shown in FIG. 11, molten resin injected from one of the two pairs of injection gates 95 positioned nearer to the concave portion (recess) 91 flows around the concave portion 91 of the throttle gear 32 along a first path detouring the concave portion 91 (including the slot 93) and passing through the side of the toothed portion 80 as indicated by an arrow Y1 in FIG. 11 and also along a second path detouring the concave portion 91 and passing through the side of the non-toothed portion 83 as indicated by an arrow Y2 in FIG. 11. The molten resin flowing along the first path will be hereinafter called a first molten resin. Similarly, the molten resin flowing along the second path will be hereinafter called a second molten resin. The first and second molten resins merge to form the welded portion 116 at the non-toothed portion 83. Thus, because the slot 93 is formed in series with the concave portion 91, the distance (length of the first path) of the flow of the first molten resin from the corresponding injection gate 95 to the welded portion 116 is longer than the distance (length of the second path) of the flow of the second molten resin from the corresponding injection gate 95 to the welded portion 116. For this reason, the welded portion 116 is formed at the non-toothed portion 83. In FIG. 11, the arrows Y1 and Y2 indicate main streams of the first molten resin and the second molten resin molten, respectively.

If no slot 93 is formed, the second molten resin may not flow along the second path but may flow along a third path as indicated by an arrow Y3 in FIG. 11. The distance of flow of the second molten resin along the third path (indicated by the arrow Y3) from the corresponding injection gate 95 to the welded portion 116 is shorter than the distance of flow of the first molten resin along the first path (indicated by the arrow Y1) from the corresponding injection gate 95 to the welded portion 116. Therefore, the welded portion 116 may be formed at the toothed portion 80 to the result that the strength and the molding accuracy of the teeth 81 of the toothed portion 80 may be degraded. As noted above, according to the present example, the welded portion 116 is formed at the non-toothed portion 83, and therefore, it is possible to avoid this problem.

Thus, according to this example, the welded portion 116 formed at the non-toothed portion 83 by the merger of flow of the molten resin along the first path (indicated by the arrow Y1 in FIG. 11) detouring the concave portion 91 and passing through the side of the toothed portion 80 and flow of the molten resin along the second path (indicated by the arrow Y2 in FIG. 11) detouring the concave portion 91 and passing through the side of the non-toothed portion 83. Therefore, in the case that the recess 91 is formed on the radially inner side of the boundary region 90 between the toothed portion 80 and the non-toothed portion 83 of the throttle gear 32, it is possible to avoid degradation of the strength and the molding accuracy of the teeth 81 of the toothed portion 80 in comparison with the arrangement where the welded portion 116 is formed at the toothed portion 80 of the throttle gear 32.

Further, the welded portion 116 is formed by the merger of flow of molten resin from two different injection gates 95. Therefore, it is possible to minimize the distances (lengths of the paths of the molten resin) from the injection gates 95 to the welded portion 116.

Furthermore, the slot 93 is formed on the side of the non-toothed portion 83 of the concave portion 91 to produce the flow of the molten resin (indicated by the arrow Y2 in FIG. 11) detouring the concave portion 91 and passing through the side of the non-toothed portion 83 along the second path. Therefore, it is possible to set the flow distance of the second molten resin (the length of the second path) to be long enough to form the welded portion 116 at the non-toothed portion 83 by the merger of the flow of the molten resin along the first path (indicated by the arrow Y1) and the flow of the molten resin along the second path (indicated by the arrow Y2).

Furthermore, according to the above example, the throttle device 10 (see FIGS. 1 and 2) can be provided to have the throttle gear 32 that is molded as described above and mounted to the throttle shaft 20 having the throttle valve 25.

Furthermore, the S-shaped hook 68 of the torsion coil spring 54 can engage the concave portion 91 of the throttle gear 32 (see FIG. 4). In other words, the S-shaped hook 68 of the torsion coil spring 54 can engage the throttle gear 32 through the concave portion 91.

Furthermore, the throttle gear 32 is molded while each of the permanent magnets 36 of the throttle opening angle sensor 52 used for detecting the open angle of the throttle valve 25 is positioned at an intermediate position between two injection gates 95 (see FIG. 7). Therefore, the pressure of the molten resin injected from one of the two injection gates 95 and the pressure of the molten resin injected from the other of the two injection gates 95 are equalized. As a result, it is possible to prevent the permanent magnets 36 from being moved due to the difference in pressure between the molten resin supplied from two different injection gates 95.

Another example will now be described with reference to FIGS. 13 and 14. This example is a modification of the above example and is different from the above example only in the configuration of the throttle gear. Therefore, in FIGS. 13 and 14, like members are given the same reference signs as the above example and the description of these members will not be repeated.

Figure 13:
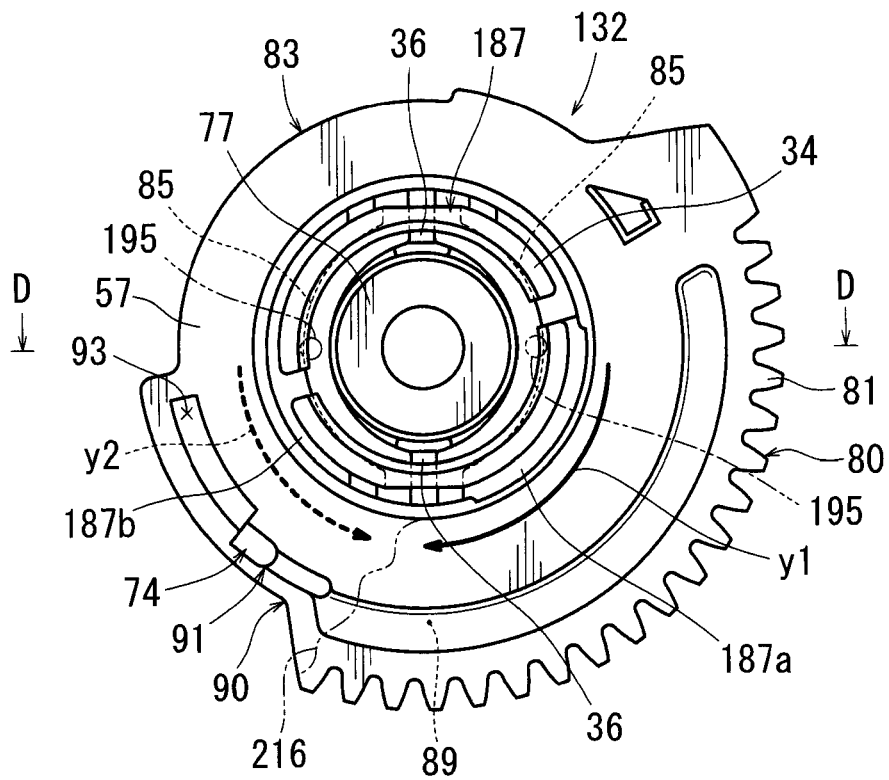
FIG. 13 is a plan view of a throttle gear according to another example.
Figure 14:
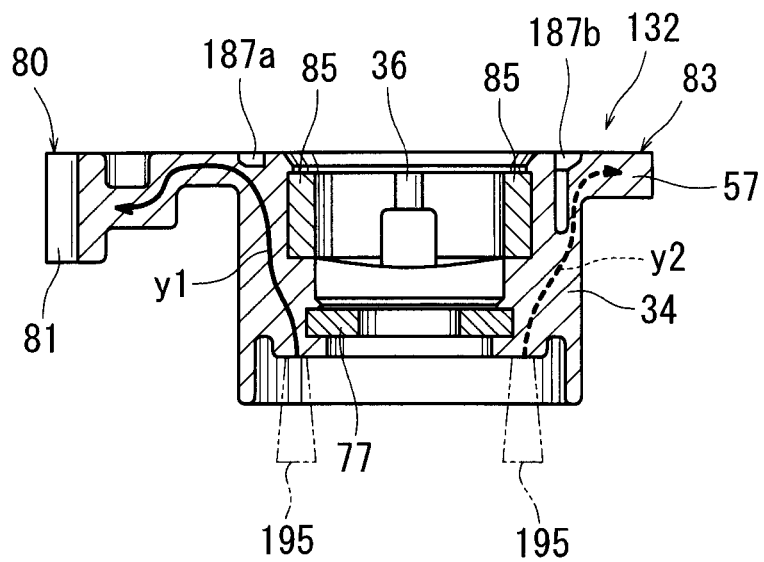
FIG. 14 is a cross sectional view taken along line XIII-XIII in FIG. 13.

Referring to FIGS. 13 and 14, according to a throttle gear 132 of this example, a portion 187a of an annular groove 187 (corresponding to the annular groove 87 of the above example) detouring the concave portion 91 and passing through the side of the toothed portion 80 has a depth shallower than that of the corresponding groove portion of the annular groove 87. On the other hand, a portion 187b of the annular groove 187 detouring the concave portion 91 and passing through the side of the non-toothed portion 83 has a depth deeper than that of the corresponding groove portion of the annular groove 87. Therefore, the depth of the portion 187a of the annular groove 187 is shallower than the depth of the portion 187b. With this configuration, the resistance against flow of the molten resin detouring the concave portion 91 and passing through the side of the toothed portion 80 during the molding process of the throttle gear 132 is smaller than the resistance against flow of the molten resin detouring the concave portion 91 and passing through the side of the non-toothed portion 83. In this way, the annular groove 187 serves as a flow resistance adjusting device.

Also with the throttle gear 132 of this example, it is possible to achieve the same advantages as the throttle gear 23 of the above example.

In addition, the annular groove 187 is configured to make the resistance against flow of the molten resin detouring the concave portion 91 and passing through the side of the toothed portion 80 to be smaller than the resistance against flow of the molten resin detouring the concave portion 91 and passing through the side of the non-toothed portion 83. Therefore, the flow speed of the molten resin detouring the concave portion 91 and passing through the side of the toothed portion 80 becomes to be faster than the flow speed of the molten resin detouring the concave portion 91 and passing through the side of the non-toothed portion 83. Therefore, a welded portion 216 produced due to merger of the flow of the molten resin detouring the concave portion 91 and passing through the side of the toothed portion 80 (indicated by an arrow y1 in FIGS. 13 and 14) and the flow of the molten resin detouring the concave portion 91 and passing through the side of the non-toothed portion 83 (indicated by an arrow y2 in FIGS. 13 and 14) can be positioned at the non-toothed portion 83.

Further, the annular groove 187 is formed in the end surface of the gear body 34 and the portion 187a of the annular groove 187 detouring the concave portion 91 and positioned on the side of the toothed portion 80 has a depth shallower than the depth of the portion 187b detouring the concave portion 91 and positioned on the side of the non-toothed portion 83. Thus, the deep depth of the portion 187b of the annular groove 187 leads to decrease in a cross sectional area of the flow path on this side, so that the resistance against flow of the molten resin is increased. On the other hand, the shallow depth of the portion 187a of the annular groove 187 leads to decrease in a cross sectional area of the flow path on this side, so that the resistance against flow of the molten resin is decreased. In this way, the annular groove 187 formed in the end surface of the gear body 34 can be used as a resistance adjusting device for setting the flow speed of the molten resin detouring the concave portion 91 and passing through the side of the non-toothed portion 80 to be faster than the flow speed of the molten resin detouring the concave portion 91 and passing through the side of the toothed portion 83.

Further, in this embodiment, the number of injection gates 195 corresponding to the injection gates 95 is set to be two instead of four. More specifically, two injection gates 195 are set on the lower side of the gear body 34 and are positioned on a circle line about the gear body 34 so as to be symmetrical with respect to a central pint of the circle line. Also, the injection gates 195 are provided on the molding die 100 (see FIG. 10) that is used for molding the throttle gear 132. In FIGS. 13 and 14, the injection gates 195 are shown by two-dot chain lines for the purpose of illustration.

The above examples can be modified in various ways. For example, the above teachings can be applied to any resin gears other than the throttle gear 32(132) as long as they have a toothed portion and a non-toothed portion. In addition, although the welded portion 116 is formed at the non-toothed portion 83 by providing the slot 93 (i.e., the distance adjusting concave portion) in series with the concave portion 91 of the throttle gear 32, it is possible to form the welded portion 116 at the non-toothed portion 83 without providing the distance adjusting concave portion by suitably setting the positions of the injection gates 95. In the case that the injection gates 95 are provided in a plural number to detour the concave portion 91 of the throttle gear 32, the molten resin may be injected through the injection gates 95 at different speeds for the first path and the second path in order to form the welded portion 116 at the non-toothed portion 83. The number of the injection gates 95 detouring the concave portion 91 of the throttle gear 32 may not be limited to two but may be one or three or more. Further, the distance adjusting concave portion may not be limited to the slot 93 but may be a bottomed recess. Further, the distance adjusting concave portion is not necessary to be formed in series with the concave portion 91 but may be formed separately from the concave portion 91. The hook portion 68 of the coil spring 54 for engaging the concave portion 91 of the throttle gear 32(132) may not be limited to have an S-shape but may have an I-shape, a U-shape or any other shape. Although the coil spring 54 has the return spring portion 62 and the opener spring portion 64 that are formed by a single spring wire, the return spring portion 62 and the opener spring portion 64 may be formed by two different coil springs. Further in the example shown in FIGS. 13 and 14, the slot 93 (distance adjusting concave portion) can be omitted from the throttle gear 132.

What is claimed is:

1. A resin gear comprising:
   a gear body;
   a toothed portion and a non-toothed portion formed on an outer periphery of the gear body; and
   a concave portion formed on the gear body at a position radially inward of a boundary region between the toothed portion and the non-toothed portion;
   wherein the gear body, the toothed portion, the non-toothed portion and the concave portion are made of resin and molded together through injection of molten resin from a first injection gate set and a second injection gate set on the side of the gear body, the first injection gate and the second injection gate being space from each other in a circumferential direction of the gear body;
   a welded portion formed at the non-toothed portion by merger of flow of the molten resin along a first path from the first injection gate and flow of the molten resin along a second path from the second injection gate;
   wherein, the first path detours the concave portion and passes through the side of the toothed portion, and the second path detours the concave portion and passes through the side of the non-toothed portion; and
   a distance adjusting concave part provided at a position on the side of the non-toothed portion with respect to the concave portion and allowing adjustment of a distance from the injection gate to the welded portion along the first path, so that a position of the welded portion in a circumferential direction of the gear body is adjusted; and
   a permanent magnet inserted into the gear body;
   wherein the permanent magnet is positioned at an intermediate position with respect to the circumferential direction between the first injection gate and the second injection gate, so that a pressure of the molten resin from the first injection gate and a pressure of the molten resin from the second injection gate are applied equally to the permanent magnet.

2. The resin gear as in claim 1, further comprising a resistance adjusting concave part allowing reduction of a resistance against flow of the molten resin along the first path than a resistance against flow of the molten resin along the second path.

3. The resin gear as in claim 2, wherein:
the resistance adjusting concave part is an annular groove formed on an end surface of the gear body;
the annular groove has a first part detouring the concave portion and extending through the side of the toothed portion and a second part detouring the concave portion and extending through the side of the non-toothed portion; and
the first part has a depth shallower than a depth of the second part.

4. A method of manufacturing a resin gear having a gear body, a toothed portion and a non-toothed portion formed on an outer periphery of the gear body, and a concave portion formed on the gear body and positioned radially inward of a boundary region between the toothed portion and the non-toothed portion, the method comprising:
molding the resin gear through injection of molten resin into a mold cavity of a molding die via a first injection gate set and a second injection gate set on the side of the gear body, the first injection gate and the second injection gate being space from each other in a circumferential direction of the gear body, so that a welded portion is formed at the non-toothed portion by merger of flow of the molten resin along a first path from the first injection gate and flow of the molten resin along a second path from the second injection gate;
wherein, the first path detours the concave portion and passes through the side of the toothed portion, and the second path detours the concave portion and passes through the side of the non-toothed portion;
a distance adjusting concave part is provided at a position on the side of the non-toothed portion with respect to the concave portion and allowing adjustment of a distance from the injection gate to the welded portion along the first path, so that a position of the welded portion in a circumferential direction of the gear body is adjusted;
a permanent magnet is inserted into the gear body; and
wherein the permanent magnet is positioned at an intermediate position with respect to the circumferential direction between the first injection gate and the second injection gate, so that a pressure of the molten resin from the first injection gate and a pressure of the molten resin from the second injection gate are applied equally to the permanent magnet.

5. The method as in claim 4, further comprising the step of reducing a resistance against flow of the molten resin along the first path than a resistance against flow of the molten resin along the second path by providing a resistance adjusting concave part in the resin gear.

6. The method as in claim 5, wherein:
the resistance adjusting concave part is an annular groove formed on an end surface of the gear body;
the annular groove has a first part detouring the concave portion and extending through the side of the toothed portion and a second part detouring the concave portion and extending through the side of the non-toothed portion; and
the first part has a depth shallower than a depth of the second part.

* * * * *

UNITED STATES PATENT AND TRADEMARK OFFICE
CERTIFICATE OF CORRECTION

PATENT NO. : 8,904,999 B2
APPLICATION NO. : 12/875324
DATED : December 9, 2014
INVENTOR(S) : Masanobu Kondo et al.

It is certified that error appears in the above-identified patent and that said Letters Patent is hereby corrected as shown below:

On the title page, item (73) should read

(73) Assignee: AISAN KOGYO KABUSHIKI KAISHA, OBU-SHI, AICHI-KEN, (JP)
DENSO CORPORATION, KARIYA-SHI, AICHI-KEN, (JP)

Signed and Sealed this
Twelfth Day of January, 2016

Michelle K. Lee
*Director of the United States Patent and Trademark Office*